AUTOMATIC CALIBRATION APPARATUS FOR TIME SHARING DATA TRANSMISSION SYSTEMS
Filed March 4, 1963
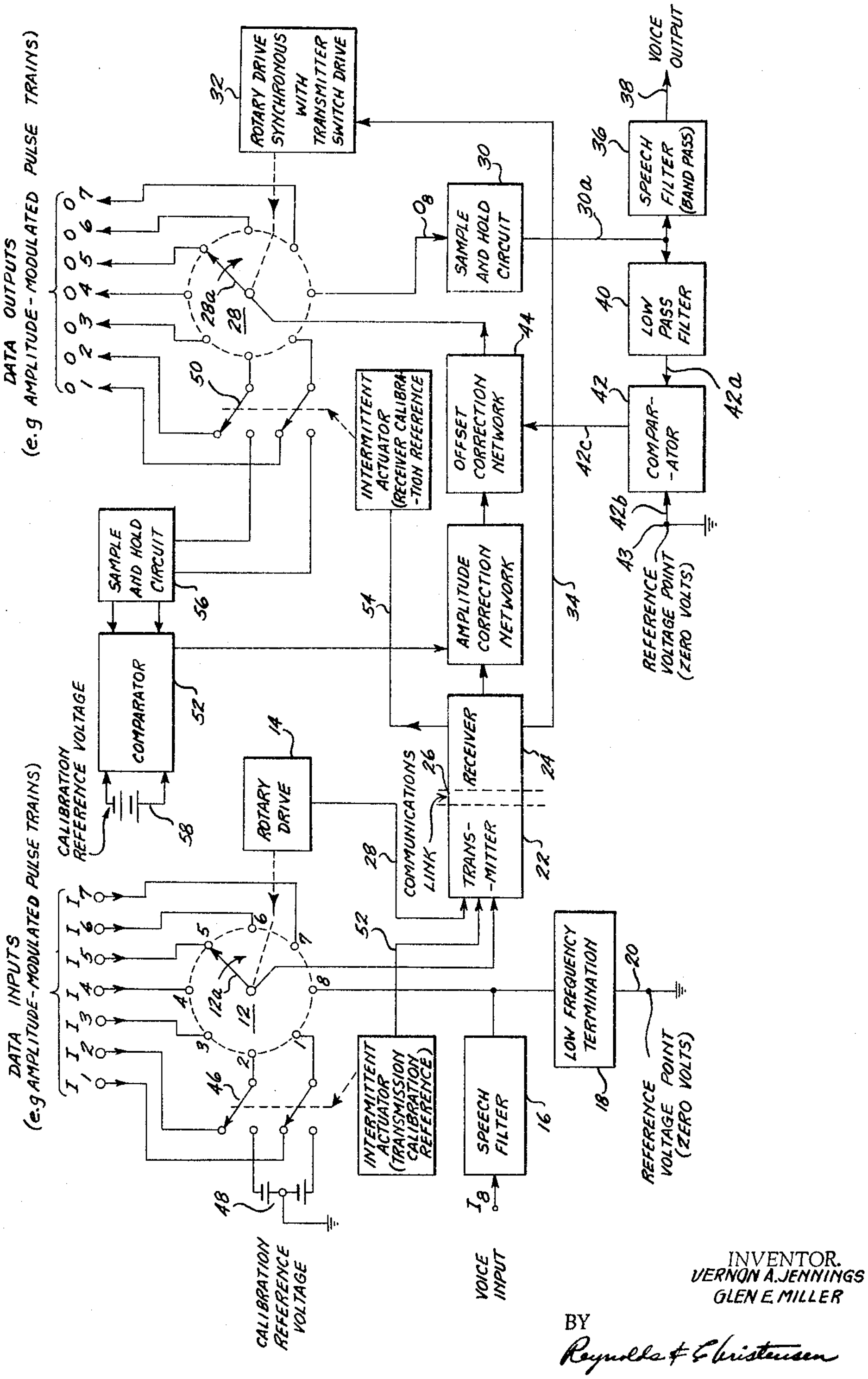
INVENTOR.
VERNON A. JENNINGS
GLEN E. MILLER
BY Reynolds & Christensen
ATTORNEYS United States Patent Office 3,268,665
Patented August 23, 1966

3,268,665

AUTOMATIC CALIBRATION APPARATUS FOR TIME SHARING DATA TRANSMISSION SYSTEMS

Glen E. Miller, Kent, and Vernon A. Jennings, Auburn, Wash., assignors to The Boeing Company, Seattle, Wash., a corporation of Delaware Filed Mar. 4, 1963, Ser. No. 262,777
8 Claims. (Cl. 179—15)

This invention relates to improvements in time sharing data transmission systems of the multiplex type and, particularly to a new and improved means for eliminating the effects of D.C. drift occurring at any stage or stages in the system, thereby to maintain consistently accurate correlation of values between receiver output data and transmitter input data. The invention is herein illustratively described by reference to the presently preferred embodiment thereof; however it will be recognized that certain variations and changes therein may be made without departing from the essential features involved.

The invention is applicable in the automatic calibration of time division multiplex systems in which one data channel, referred to as the calibration channel, is reserved for A.C. data signals and one or more other data channels are required to carry signals having D.C. components with or without A.C. components. An example of such a system is a pulse amplitude modulation medical data telemetering system. A broad object of this invention is to achieve direct voltage calibration of such a system in a relatively simple and reliable manner and without regard to the number of data channels or the number or complexity of serially connected elements in the transmission link. A related object is to achieve this result without retarding operation of the system nor depriving it of the service of any channel for its intended function of transmitting data.

A specific object hereof is to devise a continuously operative automatic means for regulating or compensatively adjusting D.C. level of signals delivered by the receiver to the receiver output channels so as to maintain a predetermined quantitative relationship thereof to the original data applied to the transmitter input channels.

In accordance with this invention there is introduced into the receiver, ahead of the multiplexing switch, a compensating D.C. component derived as the difference between a constant reference voltage originating at the receiver end of the system, and a D.C. voltage derived in the receiver from a transmitted D.C. signal originating at the transmitter. The derived D.C. voltage at the receiver is filtered from the output of a sample-and-hold detector circuit which is responsive to the mixed A.C. and D.C. components carried by the calibration channel. The output of the sample-and-hold detector circuit comprises a stepped voltage wave the transitions of which occur with each repetition of the multiplexing cycle of the total system. Each new level of voltage thus presented in the output of this detector circuit represents receiver output voltage at the instant the calibration channel referred to is connected to the receiver. These sampled and detected voltage values representing the plateaus in the step-wave function include a combination of A.C. signal and transmitted D.C. reference voltage components. The A.C. components are selected from the step-wave function for data output purposes, whereas the D.C. component is selectively applied to a voltage comparator which derives an error signal related to the difference between such D.C. component and the D.C. reference voltage originating in the receiver, as previously mentioned. Such error signal, applied to an offset correction circuit in the receiver, establishes receiver D.C. level substantially continuously at a value related to transmitter D.C. level. Because all channels share the receiver, the D.C. level of all channel output signals is at all times properly calibrated.

Inasmuch as the transmitter and receiver multiplexing switches operate synchronously in any suitable or usual manner, and D.C. level of the receiver is subjected to a corrective action on each multiplexing cycle there is no interruption in the normal multiplexing time division functioning of the system, but a continuous regulation thereof which assures accuracy in the reproduction of data at the receiver end of the system. The application of the inventive principles to a time division multiplexing system having a certain bandwidth requirement in the A.C. data channel (calibration channel) used to carry the D.C. calibration voltage imposes no significant limitation on the multiplexing frequency, upon the number of channels which may be accommodated, nor the fraction of the total multiplexing cycle consumed by the calibration function. This is true inasmuch as the sample-and-hold detector circuit is instantly responsive to the value of receiver output voltage during that fraction of the multiplexing cycle when the calibration channel is activated or selected by the multiplexing switches, and performs its corrective function through the voltage comparator circuit in the remaining or interim portion of the total cycle when other channels are being activated. Therefore the limiting factors on multiplexing operation, as they relate to duty cycle of the calibration channel and multiplexing frequency, become the usual limiting factors in any multiplexing time division data transmission system.

These and other features, objects and advantages of the invention will become more fully evident from the following description thereof by reference to the accompanying drawing.

The drawing comprises a block diagram of a total data transmission system incorporating the invention in its presently preferred embodiment of the pulse amplitude modulation type.

In the illustrative embodiment, the transmission apparatus comprises eight data channel inputs $I_1, I_2 \ldots I_8$. Input $I_8$ normally carries only alternating current signals, such as speech-frequency signals, and no direct current signal components. It is this channel which is used as the calibration channel. Inputs $I_1, I_2 \ldots I_7$ are arranged to carry direct current signals with or without alternating current signal components. In a medical data telemetering system, for example, direct voltages of different values, or recurrent pulses of different magnitudes, representing quantitative data to be transmitted, are applied through inputs $I_1, I_2 \ldots I_7$. The different data inputs are connected to correspondingly numbered stationary contacts of the rotary multiplexing switch 12 which includes a wiper 12A continuously rotated by the drive unit 14. Wiper 12A engages the stationary contacts of the switch in successive order on recurring cycles of rotation at a speed which produces recurrent sampling of the signal in input $I_8$ at a frequency exceeding (preferably by at least a few times) the highest-frequency component to be carried by the input channel $I_8$.

The signal from $I_8$ is applied to its associated switch contact through a high-pass (speech frequency) filter 16 which eliminates the possibility of any D.C. components passing from the input terminal $I_8$ to the associated contact of switch 12. A low-frequency termination, such as a reactive network 18, is connected between the output of filter 16 and a source 20 of reference voltage, such as, in the example, a point of ground potential. Typically, data input $I_8$ carries voice-frequency signals ranging between 300 c.p.s. and 3,000 c.p.s., and switch rotor 12A is turned at a speed producing recurrent sampling of signals in input $I_8$ at 15,000 c.p.s., which is five times the highest frequency of voice frequency signals required to be transmitted in the system. In order to facilitate such rapidly recurrent sampling of this signal by a mechanical switch, contact 8 of switch 12 will ordinarily not comprise a single stationary contact but will comprise a series of electrically interconnected contact elements respectively arranged in the spaces between the successive data input contacts (1, 2 . . . 7) of the switch, which are connected respectively to the inputs $I_1$, $I_2$ . . . $I_7$, whereby the signal in data input channel $I_8$ is sampled not once but several times on each complete cycle of rotation of the switch rotor $12_A$. This is true even though the drawing illustrates only a single contact (8). Yet in some cases a single contact will suffice.

Switch wiper 12A is connected to a transmitter 22 of any suitable or conventional design comprising part of or associated with a communication link 26 which may represent an electrical conductor, a microwave relay system, or any other means of projecting signals from one point to another. Synchro or other switch-position signals are also transmitted over the communications link, as depicted by the transmitter input connection 28 connecting the rotary drive 14 to the input of the communications link.

Receiving apparatus including a receiver 24 operatively associated with the communication link 26 applies the resultant multiplex signals thus transmitted to the wiper 28A of a multiplexing switch 28 which may be similar to the switch 12 and which has stationary contacts corresponding in number and relative sequential positions to those of the transmitter switch 12. These receiver switch contacts are respectively connected to output conductors or terminals designated $O_1$, $O_2$ . . . $O_8$. The switch contact connected to output conductor $O_8$ of the calibration channel intermittently applies the instantaneous algebraic sum of D.C. reference voltage (calibration) component and speech signal A.C. (data) components, derived from wiper 28A, to a sample-and-hold circuit 30. To do this, wiper 28A is driven in synchronism with transmitter switch wiper 12A by a drive unit 32 operated by the transmission of synchronizing signals over the communication link from transmitter conductor 28 to receiver conductor 34.

The output 30*a* of sample-and-hold detector circuit 30 is a stepped wave function, the incremental increases or decreases in the value of which represent the change in sampled value of combined A.C. and D.C. signals components carried in data output conductor $O_8$. A.C. (speech-frequency) signals in the selected pass band (i.e. 300 c.p.s. to 3,000 c.p.s.) are filtered from this stepped wave voltage function by the speech filter 36 and presented at the A.C. (voice) data output terminal 38 in the usual manner. The D.C. component in the output of sample-and-hold circuit 30 is derived in a low-pass filter 40 which rejects A.C. components, and is applied to one input $42_a$ of a voltage comparator circuit 42. Comparator 42 may comprise a conventional D.C. differential amplifier. A D.C. reference voltage originating in the receiver system, such as from the point of ground potential 43, is applied to the second input, $42_b$, of comparator 42. As a result the output $42_c$ of the comparator circuit 42 is a D.C. error voltage related in value to the difference between the D.C. voltages applied to the respective inputs of the comparator.

Interposed in the receiver channel between the receiver proper (24) and the switch wiper 28A is a voltage-controlled offset correction network 44 operable in response to a D.C. error voltage to increase or decrease the D.C. level of output signals carried in the receiver channel. Error voltage in the comparator circuit output $42_c$ applied to the network 44 thus effects a corresponding change in receiver D.C. level which regulates the receiver level to offset the effects of drift at any point in the system ranging from the input to the transmitter 22 to the output of the receiver 24. This follow-up or regulatory action thereby assures that the data signals made up at least in part of D.C. components, and which are applied to the respective receiver output conductors $O_1$, $O_2$ . . . $O_7$ are directly representative of the original signals applied in the corresponding transmitter data inputs $I_1$, $I_2$ . . . $I_7$.

An improved data transmission system incorporating this invention may also include an amplitude or gain correction arrangement. In the illustrated case this entails use of separate reference contacts in the transmitter and receiver switches 12 and 28 or, as illustrated, it entails provisions for intermittent temporary interruption of normal data transmission from two successive data inputs $I_1$, $I_2$ . . . $I_7$ in order to transmit gain correction or amplitude calibration signals. Such interruption is effected by a double-pole, double-throw switch 46. In the alternate setting of this switch, the positive and negative terminals of direct-voltage source 48 are applied to two successive terminals (1 and 2) such as those normally connected to inputs $I_1$ and $I_2$. A similar double-throw, double-pole switch 50, operatively associated with the receiver multiplexing switch, is actuated synchronously with the switch 46 by means of actuation signals transmitted through the communications link 26 through the circuit conductors 52 and 54. A sample-and-hold circuit 56 in the receiver system detects and holds the instantaneous potentials applied to the stationary contacts of switch 28 which correspond to those mentioned in switch 12, during rotation of the multiplexing switch rotors. The sample-and-hold circuit thus detects and stores a potential difference in the form of a D.C. voltage applied to one side of the voltage comparator 52. A reference voltage derived from a source 56 stationed at the receiver end of the system, is applied to the opposite input of comparator 52. The output of the comparator comprises a D.C. error voltage which corresponds to the difference between voltage of source 56 and voltage of source 48. This difference in voltage is proportional to the deviation of gain or amplitude factor in the total transmission system ranging from the transmitter input to the receiver output. As such, this error voltage is applied to a network 54 referred to as an amplitude correction network in order to apply corrective changes in receiver gain for regulatory purposes. Any disturbance in the total system which changes the gain is thus automatically compensated and thereby eliminated.

These and other aspects of the invention and of the improved system in which the same is illustrated will be evident from the foregoing description, which is intended as an illustration of the essential principles and not as a limitation on the scope of the invention.

We claim as our invention:

1. In a time sharing multiplexing data transmission system, transmission apparatus comprising a plurality of data input channels a first of which normally carries data signals in a frequency band excluding D.C. components and a second of which carries data signals in a frequency band including a D.C. component, transmitter means and cooperative receiver means forming a communication link common to the input channels, recurringly operable transmitter multiplexing switch means for operatively connecting the respective individual input channels to said transmitter means momentarily in a successive order, reference voltage means applying to the first input channel a predetermined D.C. reference voltage superimposed on the normal data signals in such first input channel, and reception apparatus comprising a plurality of data output channels, recurringly operable receiver multiplexing switch means operable synchronously with the transmitter switch means for operatively connecting the receiver means to the individual output channels momentarily in said successive order, and voltage comparator means operatively associated with the receiver means and including a first input having therein a source of reference D.C. voltage corresponding to said predetermined D.C. reference voltage, and having a second input, including a detector, responsively connected to the first receiver output channel, said detector being operable to sample and hold each of the successive values of combined A.C. and D.C. signal voltage in said first receiver output channel existing during the successive moments such latter channel is connected to the receiver means, said voltage comparator means being operable thereby to produce an error voltage corresponding to the difference between voltages in its respective inputs, said receiver means including offset correction means therein operable to regulate D.C. level of signals passing said receiver means, said offset correction means being responsively connected to said voltage comparator means for regulating D.C. level of receiver signals in accordance with said error voltage.

2. The system defined in claim 1, wherein the first data input channel is adapted to carry speech signal frequencies, and wherein the second input of the voltage comparator means includes a low-pass filter means arranged serially therein rejecting speech signal frequencies from said comparator means while passing D.C. signals thereto.

3. The system defined in claim 2, and a speech output connection including a bandpass filter responsively connected to the detector and operable to pass signal frequencies above a predetermined minimum speech component frequency, the repetition frequency of the successive connections of the first receiver output channel to the receiver means being higher than a predetermined maximum speech component frequency in the speech signals.

4. The system defined in claim 2, wherein the first-mentioned reference voltage means and said source of reference D.C. voltage each comprise a ground potential connection.

5. The system defined in claim 1, wherein the transmission and reception apparatus further comprise cooperable gain control means including calibration reference voltage means successively applying to said transmitter means recurringly two different values of reference potential, means in the reception apparatus operable synchronously with said calibration reference voltage means to detect at the reception apparatus the difference between said two applied values of potential after transmission thereof, a comparator circuit including a first input having a source of calibration reference voltage therein, and a second input responsively connected to the calibration reference voltage means, whereby to produce a D.C. error voltage corresponding to the difference between the voltages at its respective inputs, and means operatively applying said latter D.C. error voltage to the receiver means for regulating the gain of said receiver means in accordance with said error voltage.

6. In a time sharing multiplexing system having a plurality of data transmission channels a first of which carries A.C. data signals without D.C. data signals and a second of which carries signals including D.C. data signal components, the method of calibrating the data signals in the second channel, after reception, in relation to the D.C. level of such signals before transmission, said method comprising the steps of momentarily transmitting and receiving periodically over the first channel a D.C. reference signal superimposed on the A.C. data signals therein, detecting such D.C. reference signal after reception, comparing the same with a D.C. reference voltage originating at the receiving end of the system to produce an error voltage related to the difference therebetween, and substantially continuously utilizing such error voltage to regulate D.C. level of the data signals after reception.

7. In a time sharing multiplexing system having a plurality of data transmission channels a first of which carries A.C. data signals without D.C. data signals and a second of which carries signals including D.C. data signal components, the method of calibrating the data signals in the second channel, after reception, in relation to the D.C. level of such signals before transmission, said method comprising the steps of momentarily transmitting and receiving periodically over the first channel a D.C. reference signal superimposed on the A.C. data signals therein, sampling the momentarily transmitted D.C. reference signal after reception and holding the sampled value thereof in the interim periods, comparing the sampled value thus held with a D.C. reference voltage originating at the receiving end of the system to produce an error voltage related to the difference therebetween, and utilizing such error voltage in said interim periods to regulate D.C. level of the data signals after reception.

8. In a time sharing multiplexing system, transmitter and receiver means including a transmitting and receiving multiplex switching means forming a plurality of successively and periodically activated data transmission channels a first of which carries A.C. data signals without D.C. data signals and a second of which carries signals including D.C. data signal components, means for calibrating the data signals in the second channel, after reception, in relation to the D.C. level of such signals before transmission, comprising means operatively associated with said switching means for transmitting and receiving over the first channel coincidentally with the A.C. data signals therein a D.C. reference signal means operatively associated with the receiving switch means for detecting such D.C. reference signal after reception, a voltage comparator having first and second inputs, a D.C. reference voltage source, means directly applying the voltage of the source and said detected signal to the respective comparator inputs, said comparator being operable to produce an error voltage related to the difference between its input voltages and means applying such error voltage to said receiver means to regulate D.C. level of the data signals after reception.

References Cited by the Examiner

UNITED STATES PATENTS

| | | | |
|---|---|---|---|
| 2,753,547 | 7/1956 | Donath et al. | 340—183 |
| 3,060,268 | 10/1962 | Pinet | 179—15 |

DAVID G. REDINBAUGH, *Primary Examiner.*

R. L. GRIFFIN, *Assistant Examiner.*